United States Patent
Muju et al.

(10) Patent No.: US 6,672,966 B2
(45) Date of Patent: Jan. 6, 2004

(54) CURVIC COUPLING FATIGUE LIFE ENHANCEMENT THROUGH UNIQUE COMPOUND ROOT FILLET DESIGN

(75) Inventors: Sandeep Muju, Phoenix, AZ (US); Robert S. Sandoval, Tempe, AZ (US)

(73) Assignee: Honeywell International Inc., Morristown, NJ (US)

( * ) Notice: Subject to any disclaimer, the term of this patent is extended or adjusted under 35 U.S.C. 154(b) by 1 day.

(21) Appl. No.: 09/905,492

(22) Filed: Jul. 13, 2001

(65) Prior Publication Data

US 2003/0017878 A1 Jan. 23, 2003

(51) Int. Cl.[7] .............................................. F16D 1/02
(52) U.S. Cl. .................................... 464/157; 415/124.2
(58) Field of Search ................................ 403/340, 364; 464/157, 149; 409/10; 29/893.3, 893.35; 74/457, 462; 415/122.1, 124.2

(56) References Cited

U.S. PATENT DOCUMENTS

| | | | |
|---|---|---|---|
| 2,388,456 A | | 11/1945 | Wildhaber |
| 2,687,025 A | | 8/1954 | Wildhaber |
| 2,922,294 A | | 1/1960 | Wildhaber |
| 3,107,125 A | * | 10/1963 | Yazell, Jr. |
| 3,224,223 A | | 12/1965 | Wildhaber |
| 3,232,075 A | | 2/1966 | Wildhaber |
| 3,331,217 A | | 7/1967 | Wildhaber |
| 3,952,547 A | * | 4/1976 | Klein et al. ............ 464/149 X |
| 4,073,160 A | | 2/1978 | Perret |
| 4,357,137 A | | 11/1982 | Brown |
| 4,969,371 A | | 11/1990 | Allen |
| 5,435,694 A | * | 7/1995 | Kray et al. |
| 5,716,159 A | | 2/1998 | Tomikawa |
| 5,730,657 A | | 3/1998 | Olgren |
| 6,065,898 A | | 5/2000 | Hale |
| 6,164,880 A | | 12/2000 | Pulley et al. |
| 6,263,849 B1 | * | 7/2001 | Bonesteel et al. |

FOREIGN PATENT DOCUMENTS

| | | | | |
|---|---|---|---|---|
| SU | 1076-664 A | * | 2/1984 | ................ 74/462 |
| SU | 1546-752 A | * | 2/1990 | ................ 74/462 |
| SU | 1700320 A1 | * | 12/1991 | ................ 74/462 |

OTHER PUBLICATIONS

A. Tang, Technical Memorandum No. B10–GLC38–006–90, Apr. 27, 1990, Textron/Lycoming Company (now Honeywell, International), U.S.A.

* cited by examiner

Primary Examiner—Greg Binda
(74) Attorney, Agent, or Firm—Robert Desmond, Esq.

(57) ABSTRACT

A lower stress and higher service life curvic coupling design is disclosed for use on coupling mechanisms for assembly of components that comprise rotating elements, such as impellers, turbine wheels and couplings for gas turbine engines and other types of engines having highly stressed components. The curvic coupling design includes a compound fillet radius, comprised of a large and a small radius, located between the root and the pressure surface of all splined teeth on the torque transmitting coupling halves. The larger radius, with its lower stress concentration, is positioned in the root area where the background hoop stresses act, thereby resulting in a lower fillet peak stress value. The smaller radius smoothly connects the larger radius with the pressure surface, minimizing the penetration of the fillet surface towards the mating tooth, thereby allowing proper clearances to be maintained. The smaller radius is in a region where the background stresses are low, and therefore its higher stress concentration is not detrimental to the overall design. The inventive curvic coupling design ultimately resulted in a three-fold increase in service life.

11 Claims, 5 Drawing Sheets

COMPOUND FILLET

SINGLE FILLET

CURVIC COUPLING FATIGUE LIFE ENHANCEMENT THROUGH UNIQUE COMPOUND ROOT FILLET DESIGN

BACKGROUND OF THE INVENTION

This invention relates generally to coupling mechanisms for engines and, more particularly, to fixed curvic couplings used in the assembly of components that comprise rotating elements, such as impellers, turbine wheels and couplings for gas turbine engines and other types of engines having highly stressed components.

Curvic couplings for use in the assembly of rotating element components were developed to meet the need for permanent coupling mechanisms requiring extreme accuracy, maximum load capacity, and relatively economical rates of production. The curvic design provides an accurate, light, compact, and self-contained connection in which the curvic teeth serve as centering and driving devices. The most widely used type of curvic coupling used in gas turbine engines is the fixed curvic coupling. The fixed curvic coupling can be described as a precision face spline with teeth that possess a high degree of accuracy of tooth spacing, fine surface finish, and precision axial location.

The predominant application of fixed curvic couplings is in the assembly of the elements that comprise a gas turbine engine rotating group, i.e., impellers, turbine wheels, and couplings. Many standard turboprop and turbofan engines are examples of this application, in which the disk-like members of the rotating group are mounted solely on fixed curvic coupling teeth. A shouldered shaft acts merely as a tie-bolt and does not interfere with the centering action function of the curvic teeth.

The design of the curvic coupling itself is a function of several variables. Some of these variables include the amount of torque required to be transmitted by the coupling, the shear load and bearing load limits of the materials used in the mating designs, and the amount of tiebolt tension required to maintain full "stack" engagement under all operating conditions. Many times, the curvic teeth are located near the inside diameter (bore) of the turbine or compressor disks, which are generally regions of high hoop stress. In order to maintain acceptable curvic root stress levels, it is important to position the curvic teeth axially and radially so that the curvic teeth background stress levels are maintained at acceptable levels. Frequently, engine manufacturers employ curvic coupling designs that vary depending on the specific application. Designs vary geometrically in all major features, including: outside diameter, number of teeth, pressure angle, profile curvature, tooth depth, etc.

The curvic design is highly influenced by manufacturing constraints. Tight gaps are typically maintained between curvic teeth. These tight gaps are required to keep the "stack' dimensions short, positively impacting overall engine length (weight), shaft dynamics, and other important engine considerations. Sometimes the gaps between curvic teeth are used to meter cooling air required to maintain acceptable cool turbine disk cavities.

Care must be taken to ensure that the curvic root fillet is designed to avoid manufacturing issues such as (1) root fillet radius interference with the mating tooth, (2) mutilation of the opposite root fillet radius by the grinding wheel, or (3) the creation of "fins", or residual material in the center of the gable bottom. Proper design of both the curvic root (fillet radius and gable), along with the design of the grinding wheel itself, are crucial to ensure curvic tooth manufacturability. The traditional approach is to use a simple single fillet that is sufficiently small so as to allow ease-of-manufacturing.

The small, single fillet often results in a stress concentration feature that limits the overall fatigue life of the component. As previously stated, the position of the curvic tooth on the disk is often near a region of high background hoop stress, which is a result of the high rotational speeds of the disk as well as thermal gradients formed within the disk during engine operation. Additional curvic root stresses are the result of the axial compressive load, which keeps the "stack" components together, and the torque loads which are carried through the curvic coupling. Recent three dimensional finite element modeling has shown that some disk curvic root fillet stress levels are higher than originally thought, and the resulting service lives do not meet design intent. Expensive and time-consuming redesign of the disk is one method for reducing these limiting curvic root fillet regions. The redesign may include a material change and/or geometric changes that require replacement of not only the subject component, but also several mating components. Design, substantiation, and certification time and cost for this type of redesign may be prohibitive.

The problem of high stress levels and service life limits on curvic couplings and geometrically similar gear applications has been addressed in the past. Of particular interest in this regard are the following references and examples:

U.S. Pat. No. 6,065,898 to Hale involves a three tooth kinematic coupling, which is distinctly different in geometry and application from curvic couplings. However, as is generally the case in coupling designs, there is considerable emphasis given to a design, which reduces localized stress points, and increases stiffness and load capacity.

U.S. Pat. No. 6,164,880 to Pulley, et al, discloses a method for producing a specifically shaped fillet on a gear. The invention focuses on reduction of the bending stress as a means of reducing the likelihood of gear tooth breakage, but does not address the background hoop stress associated with high energy rotating components, nor does it address compound root radii and compound fillets.

The specific problem of curvic coupling hoop stresses and geometries was addresses by A. Tang of the Textron/Lycoming Company in technical memorandum number B10-GLC38-006-90 dated Apr. 27, 1990. The Textron/Lycoming Company subsequently merged with the assignee of this invention. The study documented in said memorandum was accomplished to define a curvic coupling geometry, which would reduce hoop stresses to acceptable levels. Results showed that a larger fillet radius with a smaller air space gap would reduce hoop stresses to acceptable levels. Although generally similar to the present invention, the concept proposed by Tang was not reduced to practice and did not address use of a compound fillet radius as conceived in this case the means to control hoop stresses.

Thus, there is a need for a redesigned curvic coupling, which will reduce stress values to acceptable levels without exceeding space limitation constraints with the ultimate result being a significant increase in service life.

SUMMARY OF THE INVENTION

In one aspect of the present invention, a toothed coupling mechanism for assembly of rotating elements of gas turbine and other engines to a shaft, comprises a pair of coupling halves, a plurality of concentric spline teeth for transmitting torque, the spline teeth having a compound fillet radius consisting of both a large radius positioned in the root area of each tooth and small radius positioned between the larger radius and the pressure surface of each tooth, the combination resulting in a lower fillet peak stress value.

In another aspect of the present invention, a method is disclosed for reducing the stresses and increasing the service life of toothed coupling mechanisms for assembly of rotating elements of gas turbine and other engines to a shaft. The method involves the steps of positioning a large filet radius in the root area of splined teeth on the coupling halves of the coupling mechanism, positioning a small filet radius in the pressure surface of each tooth, and connecting the large filet radius to the small filet radius forming a compound filet radius resulting in lower fillet peak stresses.

Other aspects, advantages and features of the invention will become more apparent and better understood, as will equivalent structures, which are intended to be covered herein, with the teaching of the principles of the invention in connection with the disclosure of the preferred embodiments thereof in the specification, claims, and drawings.

DETAILED DESCRIPTION OF THE INVENTION

The following detailed description is for the best currently contemplated methods for carrying out the invention. The description is not to be taken in a limiting sense, but is made merely for the purpose of illustrating the general principles of the invention.

Figure 1:
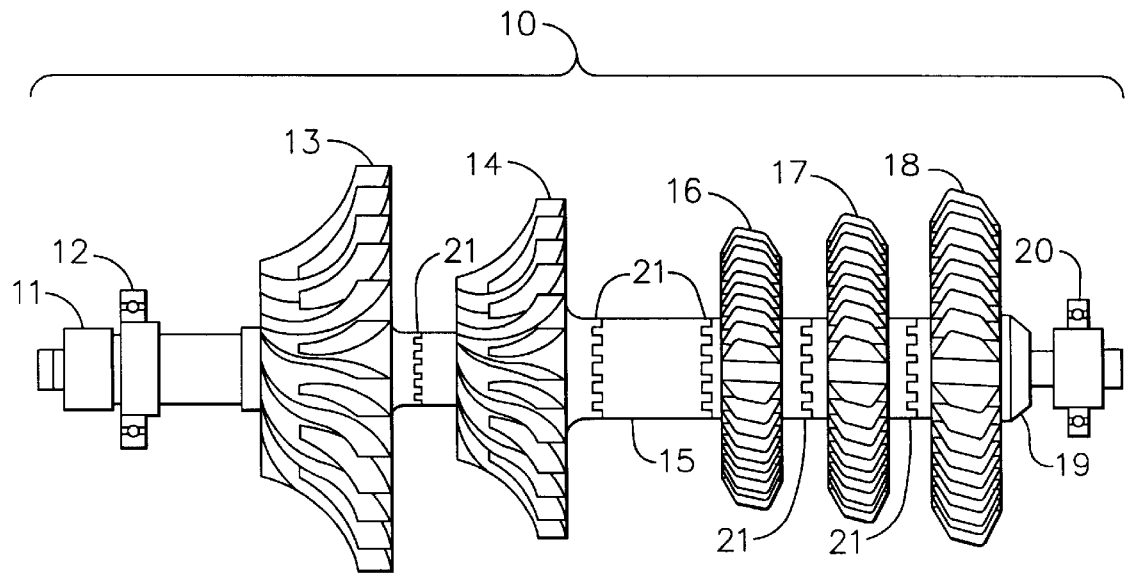
FIG. 1 is a side view of the rotating elements of a typical gas turbine engine showing curvic coupling applications in accordance with the present invention.

Referring to the accompanying drawings (in which like reference numerals indicate like parts throughout the several views), and in particular to FIG. 1, there is shown a side view of a gas turbine engine's rotating elements 10 mounted on a shouldered shaft 11 having bearings 12 and 20 on either end. The rotating group, which may be comprised of first and second stage impellers 13 and 14, coupler 15, first second and third stage turbine wheels 16, 17 and 18, and end cap 19, can be floatably mounted on the shouldered shaft 11 by means of curvic couplings 21 and tiebolts and tie nuts (shown in FIG. 2).

Figure 2:
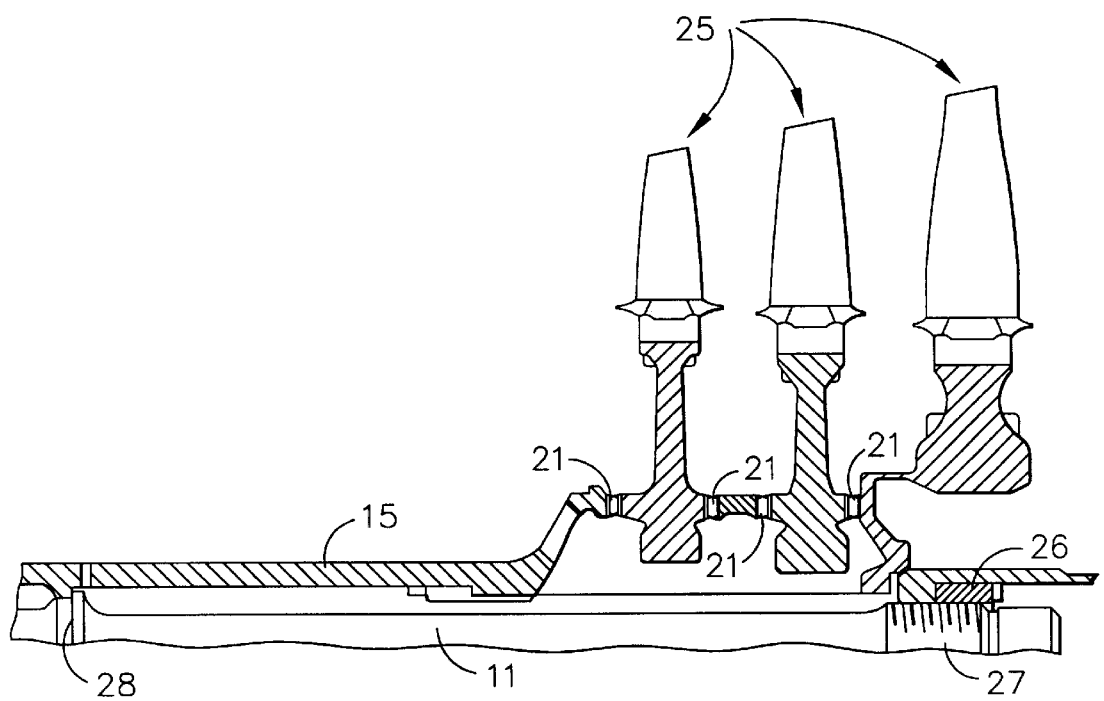
FIG. 2 is a cross sectional view showing attachment of gas turbine engine wheels by means of curvic couplings in accordance with the present invention.

FIG. 2 is a cross sectional view showing how gas turbine engine turbine wheels 25 can be mounted solely on fixed curvic coupling 21 teeth. A shouldered shaft 11, which is smaller in diameter than the center holes of the turbine wheels 25 and the coupler 15, is passed through said centers. When the turbine wheels 25 and coupler 15 are arranged in the proper locations a tie bolt nut 26 on the shouldered shaft 11 end can be adjusted on the threaded segment 27 to maintain the proper compression of the turbine wheels 25 and coupler 15 against the shoulder 28. The shouldered shaft 11 can act merely as a tie-bolt and does not interfere with the centering action of the curvic coupling 21 teeth. Other elements of the gas turbine engine, such as impellers (not shown), are assembled in the same manner.

Figure 3:
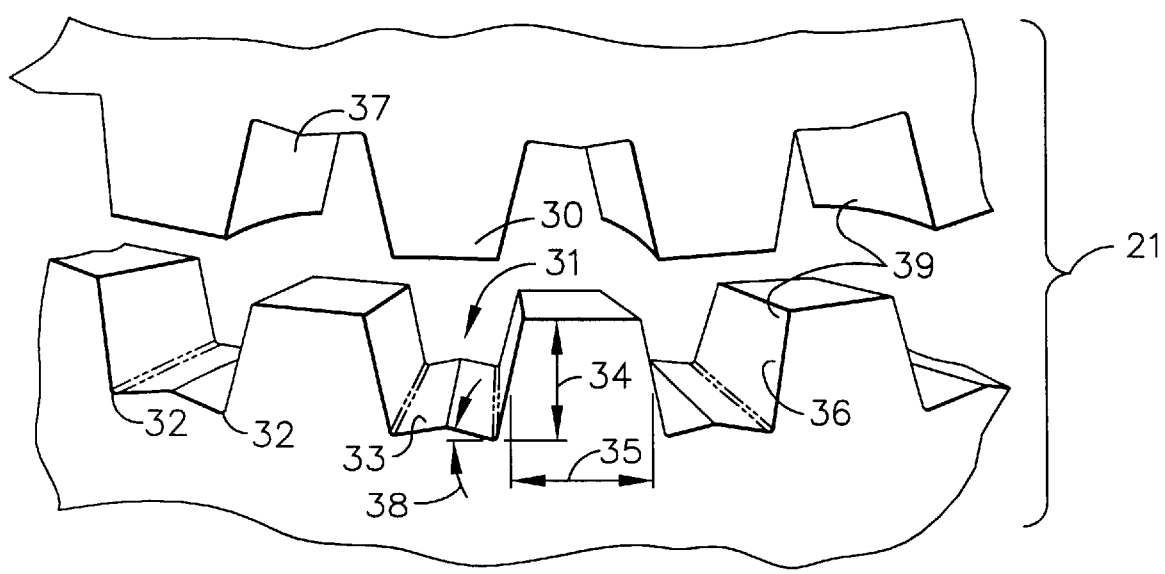
FIG. 3 is a perspective view showing details of matching male and female curvic coupling teeth in accordance with the present invention.

FIG. 3 is perspective view showing details of matching male 30 and female 31 curvic coupling 21 teeth. The curvic coupling 21 teeth may be comprised of the following geometrical elements which are of a conventional configuration known to those skilled in the art: Fillet 32 which is the fillet between the root 33 and the pressure surface 39; gable bottom or root 33; tooth depth 34 which is the overall height of each tooth as measured from the root 33; tooth thickness 35 which is the width of each tooth at the addendum; gable angle 38 which is the angle of the root 33 surface measured at the fillet 32; pressure surface 39; convex tooth profile 36 which is the profile of the pressure surface 39 that can be produced by the inside edge of cup-type grinding wheels generally used in the manufacturing process; and concave tooth profile 37 which is the profile of the pressure surface 39 that can be produced by the outside edge of cup-type grinding wheels. On some applications, the gaps between opposing curvic coupling 21 teeth are used to meter cooling air required to maintain acceptable cool turbine wheel 25 cavities (not shown).

Figure 4:
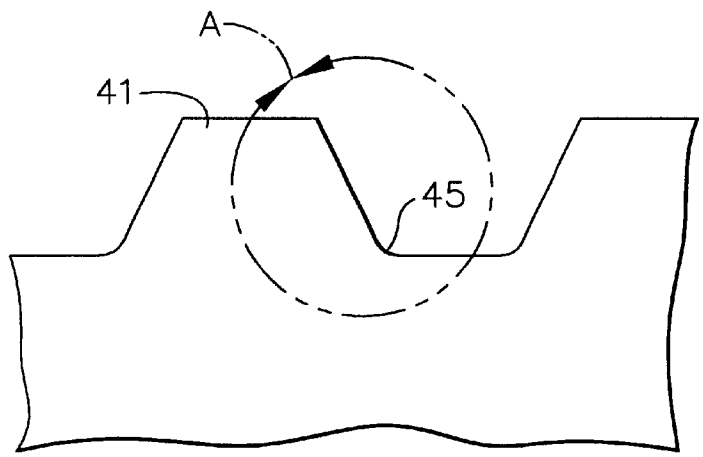
FIG. 4 is a side view of a singular prior art curvic coupling tooth.

FIG. 4 is a side view of a singular curvic coupling tooth 41 including the single fillet 45 commonly used in most prior art applications.

Figure 5:
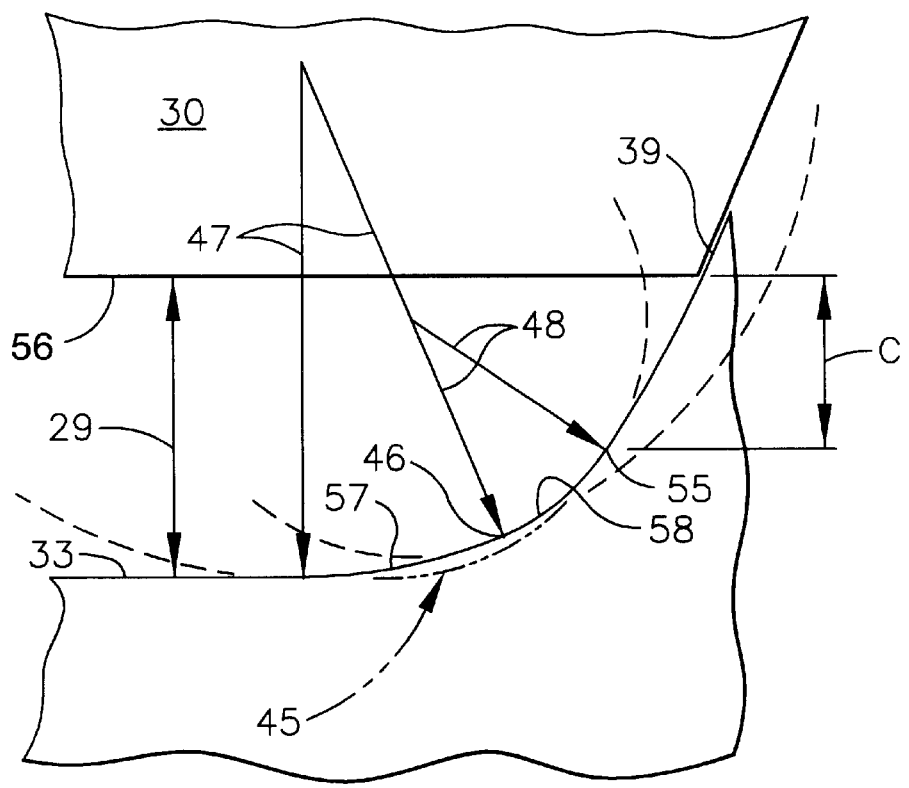
FIG. 5 is an enlarged, detailed view of a curvic coupling tooth taken along view A of FIG. 4 and showing the inventive compound fillet radius when matching male and female curvic coupling teeth are in a mated state in accordance with the present invention.

FIG. 5 is a an enlarged, detailed view of a curvic coupling tooth according to one embodiment corresponding to the location of view A of FIG. 4 and showing the inventive compound fillet which has been optimized for a specific turbine engine configuration. The prior art design fillet 45, which is the fillet between the root 33 and the pressure surface 39 (see FIG. 3) and, which can have a radius of about 0.040 to 0.055 inches, is shown in phantom in FIG. 5 for comparison to the inventive compound fillet 46 that can have a major radius 47 (or large radius) of about 0.120 inches, and a minor radius 48 (or small radius) of about 0.050. The compound fillet 46 may be comprised of major fillet 57 and minor fillet 58 respectively having a larger major radius 47 and a smaller minor radius 48 that combine to form a fillet profile that has the following positive benefits: the major fillet 57 having major radius 47, with its lower stress concentration, can be positioned in the root 33 in the area where the background hoop stresses act, thereby resulting in a lower fillet peak stress value; the minor fillet 58 having minor radius 48 may connect (or be continuous with) the major fillet 57 having major radius 47 so that minor fillet 58 having minor radius 48 may connect major fillet 57 having major radius 47 with the pressure surface 39, minimizing the penetration of the fillet surface towards the mating tooth, thereby allowing proper clearances to be maintained. Clearance C may be described as the axial separation distance between the tangency point 55 of the smaller minor fillet 58 with the tooth pressure surface 39 and a tip surface 56, or top, of the mating part tooth, i.e., matching male 30 tooth. Gaps 29 include clearance C as well as the distance between the tangency point 55 of the smaller minor fillet 58 and the root 33. By maintaining proper gaps, flow area can be maintained. By maintaining proper clearances, interference with the mating tooth may not be an issue. The minor radius 48, and thus minor fillet 58, can be in a region where the background stresses are low and well below material allowable values and, therefore, its higher stress concentration is not detrimental to the overall design. The curvic tooth design can be manufactured without opposite fillet mutilation or damage, which is frequently caused by the grinding wheel, or creation of fins (residual material in the center of the gable bottom or root 33), thus reducing the need for remanufacture of damaged parts.

The inventive compound fillet shown in FIG. 5 has been demonstrated to be effective at reducing stress and increasing life through the use of three dimensional finite element stress analysis and fracture mechanics analysis as well as subelement testing. The testing involved application of multiple load cycles at elevated temperatures to simulate peak load conditions encountered during operation. Thereafter, test specimens were thoroughly inspected for crack size and crack propagation to confirm a threefold increase in minimum (minus three sigma) life. The compound radius ratio (major radius 47/minor radius 48) for one embodiment was about 2.40. However, the ratio could be any number greater than 1.0 for specific applications. Stress analysis shows a reduction in local peak stress of approximately 20% for this design change. No change in the manufacturing technique for the curvic coupling 21 is required to implement the inventive design, other than the use of a numerically-controlled grinder to properly dress the grinding wheel with the compound fillet profile. The gable angle 38 variation has also been reduced by about 83% to reduce peak stress variability as well as to improve manufacturability. With the 20% stress reduction at the life limiting curvic fillet as the primary element of a redesign, the service life of a high pressure turbine wheel 25 can be expected to increase more than three times.

Figure 6B:
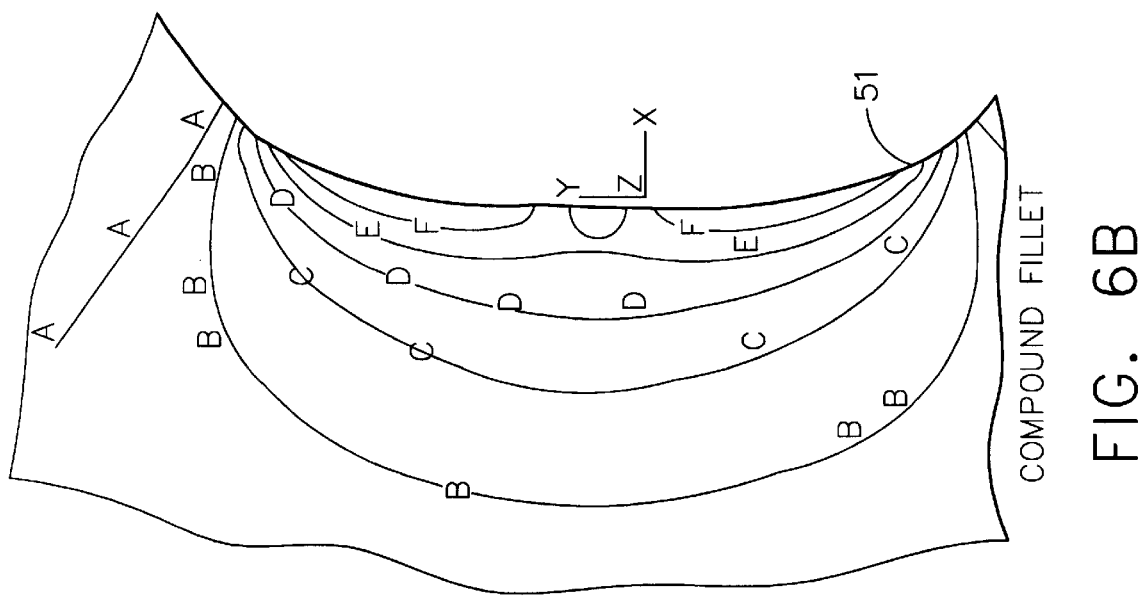
FIGS. 6A and 6B are a comparison of stress contours for a prior art (FIG. 6A) single 0.040 inch fillet and a compound (FIG. 6B) 0.120/0.050 inch fillet in accordance with the present invention.
Figure 6A:
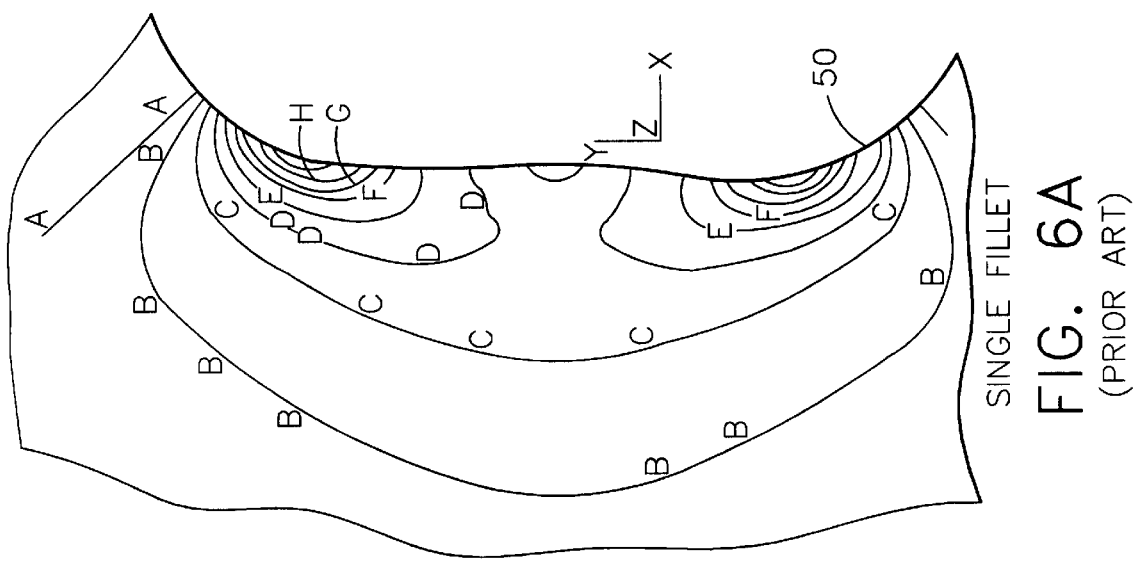

A comparison of stress contours for a prior art single 0.040 inch fillet 50 (FIG. 6A) and the inventive compound (0.120/0.050 inch) fillet 51 (FIG. 6B) is shown in FIGS. 6A and 6B. The relative stress scale (normalized on a scale of 0 to 100) is as shown on the following table:

| Countour | Stress Scale |
|---|---|
| A | 46.2 |
| B | 53.8 |
| C | 61.5 |
| D | 69.2 |
| E | 76.9 |
| F | 84.6 |
| G | 92.3 |
| H | 100 |

Figure 7:
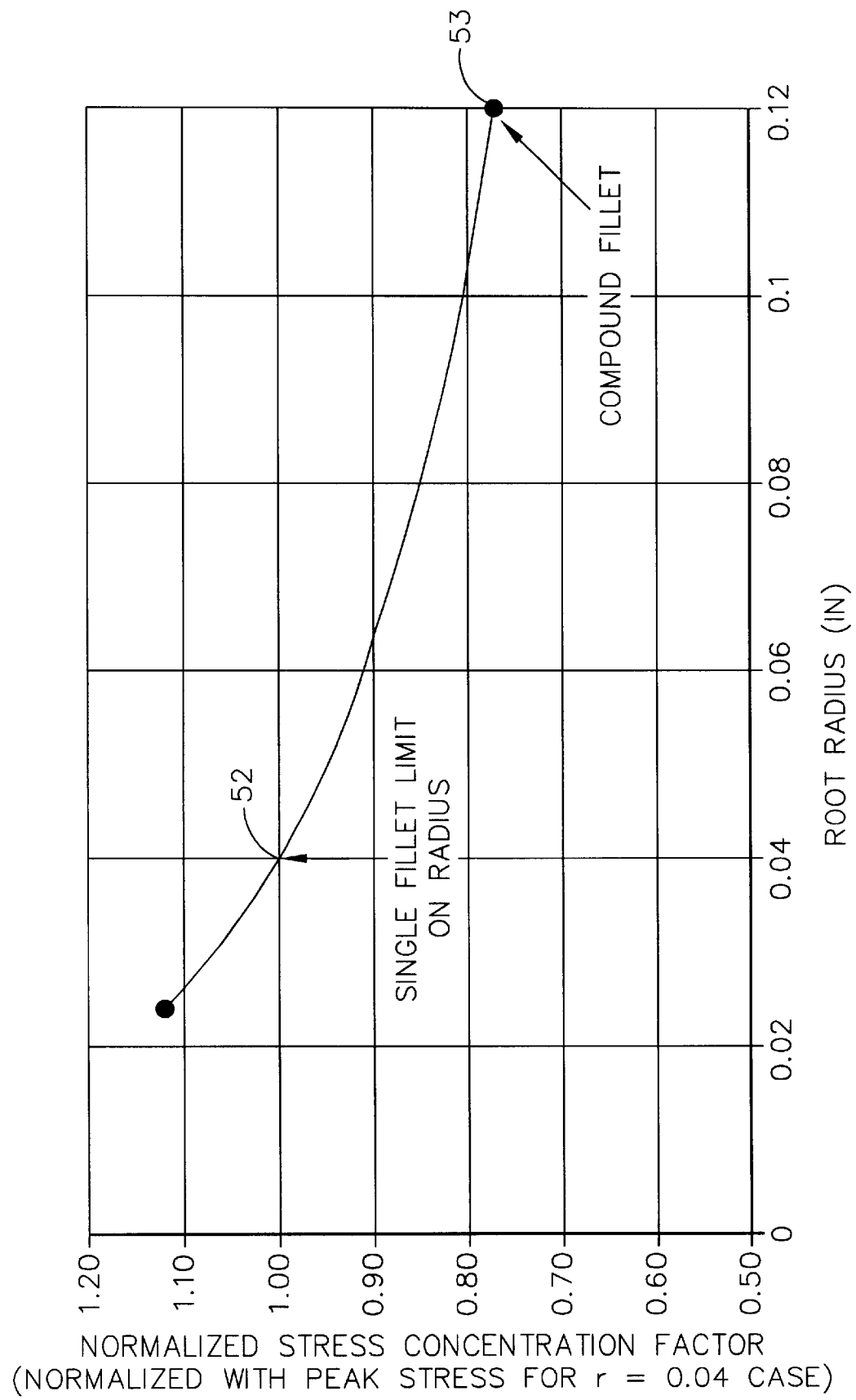
FIG. 7 is a graph that shows the sensitivity of fillet stress concentration factor to the size of the fillet, based on two dimensional finite element methods.

FIG. 7 shows the sensitivity of fillet stress concentration factor to the size of the fillet, based on two dimensional finite element methods. The single radius fillet is shown as point 52 on the curve and the compound fillet as point 53.

The optimal inventive compound curvic fillet design is dependent on the basic curvic design (outside diameter, number of teeth, pressure angle, mating tooth clearance, and other similar factors). The optimum compound fillet dimensions can be determined via finite element methods, and may not always be a compound fillet of the same proportion as determined for this embodiment (compound radius ratio= 2.40).

From the above description, it will be apparent that the present invention provides lower fillet peak stresses, while allowing proper clearances with the mating curvic coupling tooth without affecting manufacturability.

Although the present invention has been described in considerable detail with reference to certain preferred versions thereof, other versions are possible. Therefore, the spirit and scope of the appended claims should not be limited to the description of the preferred versions contained therein.

We claim:

1. A toothed coupling mechanism for transmitting torque between rotating elements, said toothed coupling mechanism comprising:

a curvic coupling having at least one male curvic coupling tooth and at least one female curvic coupling tooth, wherein said at least one male curvic coupling tooth matches said at least one female curvic coupling tooth, wherein said at least one male curvic coupling tooth has a first pressure surface and said at least one female curvic coupling tooth has a second pressure surface, wherein said at least one female curvic coupling tooth has a root, and wherein said at least one female curvic coupling tooth has a compound fillet formed between said second pressure surface and said root, wherein said compound fillet has a major fillet with a major radius and a minor fillet with a minor radius, said major radius is larger than said minor radius, said major fillet of said compound fillet is positioned in the root area of said at least one female curvic coupling tooth, and said minor fillet of said compound fillet is positioned between the major fillet and the second pressure surface of said at least one female curvic coupling tooth, wherein background hoop stresses act on the major fillet resulting in 10% to 30% lower normalized stress concentration factor, wherein said major radius and said minor radius are optimized using finite element analysis, and wherein, when said coupling mechanism is coupled, said compound fillet allows a clearance between said at least one female curvic coupling tooth and said at least one male curvic coupling tooth that matches said at least one female curvic coupling tooth, the clearance being the separation between the tangency point of the minor fillet with the second pressure surface and a tip surface of the male curvic coupling tooth.

2. The toothed coupling mechanism of claim 1, wherein said minor fillet connects said major fillet with said second pressure surface, thereby minimizing the penetration of a surface of said compound fillet toward a matching tooth.

3. The toothed coupling mechanism of claim 1, wherein said major radius is about 0.120 inches, and said minor radius is about 0.050 inches.

4. The toothed coupling mechanism of claim 1, wherein said at least one male curvic coupling have a concave tooth profile and said female curvic coupling teeth have a convex tooth profile.

5. A toothed coupling mechanism for maintaining assembly of rotating elements to a shaft in engines having hoop stressed components, said toothed coupling mechanism comprising:

a curvic coupling having at least one male curvic coupling tooth and at least one female curvic coupling tooth, wherein said at least one male curvic coupling tooth matches said at least one female curvic coupling tooth, wherein said at least one male curvic coupling tooth has a first pressure surface and said at least one female curvic coupling tooth has a second pressure surface, wherein said at least one female curvic coupling tooth has a root, and wherein said at least one female curvic coupling tooth has a compound fillet formed between said second pressure surface and said root, wherein said compound fillet has a major fillet with a larger radius and a minor fillet with a smaller radius, said major fillet of said compound fillet is positioned in the root area of said at least one female curvic coupling tooth, and said minor fillet of said compound fillet connects the major fillet and the second pressure surface of said at least one female curvic coupling tooth, wherein background hoop stresses act on the major fillet resulting in 10% to 30% lower normalized stress concentration factor, wherein said larger radius and said smaller radius are optimized using finite element analysis, and wherein said compound fillet minimizes a penetration of a fillet surface of said at least one female curvic coupling tooth toward said at least one male curvic coupling tooth that matches said at least one female curvic coupling tooth, thereby providing an air flow gap, wherein when said coupling mechanism is coupled, the air flow gap includes a clearance formed between the tangency point of the minor fillet with the second pressure surface and a tip surface of the male curvic coupling tooth.

6. The toothed coupling mechanism of claim 5, wherein torque is transmitted between the rotating elements via said at least one male curvic coupling tooth and said at least one female curvic coupling tooth, and wherein a ratio of said larger radius to said smaller radius is greater than 1.0.

7. The toothed coupling mechanism of claim 5, wherein said first pressure surface has a concave tooth profile and said second pressure surface has a convex tooth profile, whereby a centering action is provided for maintaining assembly of the rotating elements to the shaft.

8. A gas turbine engine comprising a toothed coupling mechanism for maintaining assembly of a plurality of rotating elements to a shaft and transmitting torque between at least two rotating elements of said plurality of rotating elements in said gas turbine engine, wherein said toothed coupling mechanism comprises:

a curvic coupling having at least one male curvic coupling tooth and at least one female curvic coupling tooth, wherein said at least one male curvic coupling tooth matches said at least one female curvic coupling tooth, wherein said at least one male curvic coupling tooth has a first pressure surface and said at least one female curvic coupling tooth has a second pressure surface, wherein said at least one female curvic coupling tooth has a root, wherein said at least one male curvic coupling tooth has a concave tooth profile and said at least one female curvic coupling tooth has a convex tooth profile, whereby a centering action is provided for maintaining assembly of the rotating elements to the shaft, and wherein said at least one female curvic coupling tooth has a compound fillet formed between said second pressure surface and said root, wherein said compound fillet has a major fillet with a larger radius and a minor fillet with a smaller radius, a ratio of said larger radius to said smaller radius being greater than 1.0, wherein said major fillet of said compound fillet is positioned in the root area of said at least one female curvic coupling tooth, and wherein said minor fillet of said compound fillet connects the major fillet and the second pressure surface of said at least one female curvic coupling tooth, wherein background hoop stresses act on the major fillet resulting in 10% to 30% lower normalized stress concentration factor, wherein said larger radius and said smaller radius are optimized using finite element analysis, and when said curvic coupling is coupled, said compound fillet allows a cooling air gap, the cooling gap includes a clearance formed between the tangency point of the minor fillet with the second pressure surface and a tip surface of the male curvic coupling tooth.

9. The toothed coupling mechanism of claim 8, wherein said larger radius is about 0.120 inches, and said smaller radius is about 0.050 inches.

10. A coupling mechanism, comprising:

a first toothed coupling member;

a second toothed coupling member;

said first and second toothed coupling members each having male teeth and female teeth, said male teeth of said first toothed coupling member mating with said female teeth of said second toothed coupling member, and, said female teeth of said first toothed coupling member mating with said male teeth of said second toothed coupling member;

said female teeth having side portions and a root portion therebetween, said side portions being a side portion of the adjoining male teeth, said root portion forming a gable bottom;

a compound fillet radius formed between said root portion and each of said side portions, said compound fillet radius having a first radius and a second radius, said first radius being greater than said second radius;

said first radius beginning at a tangency point of the first radius with said root portion;

said second radius beginning at a tangency point of the second radius with said side portion;

said first radius and said second radius being meeting to form said compound fillet radius; and an air flow gap formed when said first toothed coupling member is mated with said second toothed coupling member, said air flow gap includes a clearance formed between the tangency point of the second radius with the side portion and a tip surface of the male curvic coupling tooth.

11. The coupling mechanism according to claim 10, wherein:

said first radius is about 0.120 inches; and said second radius is about 0.050 inches.

* * * * *